Feb. 2, 1960 W. M. CRUMP ET AL 2,923,516
TACKLE BOX WITH SPRING-BIASED CLAMP
Filed Dec. 2, 1957
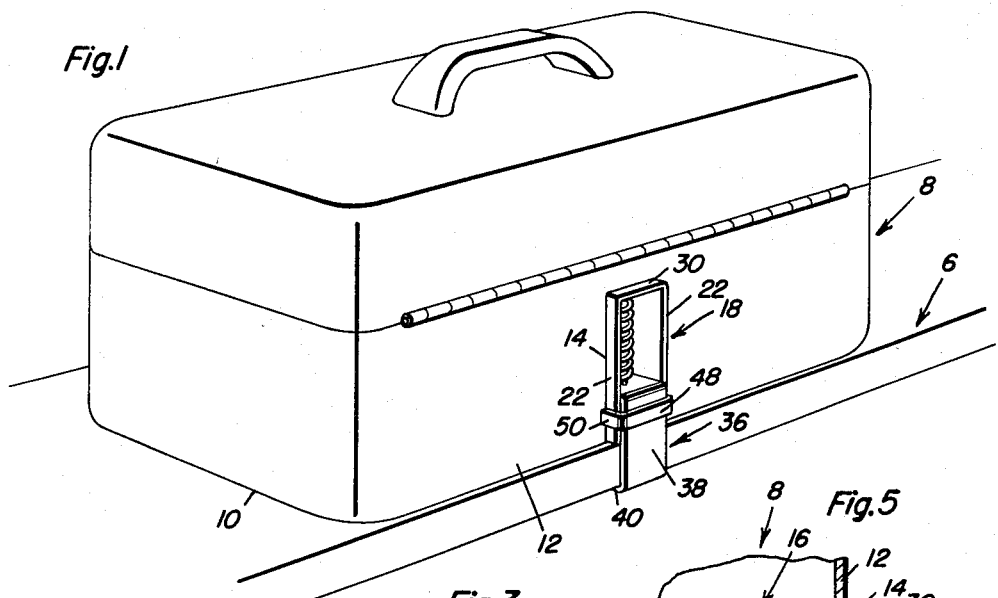
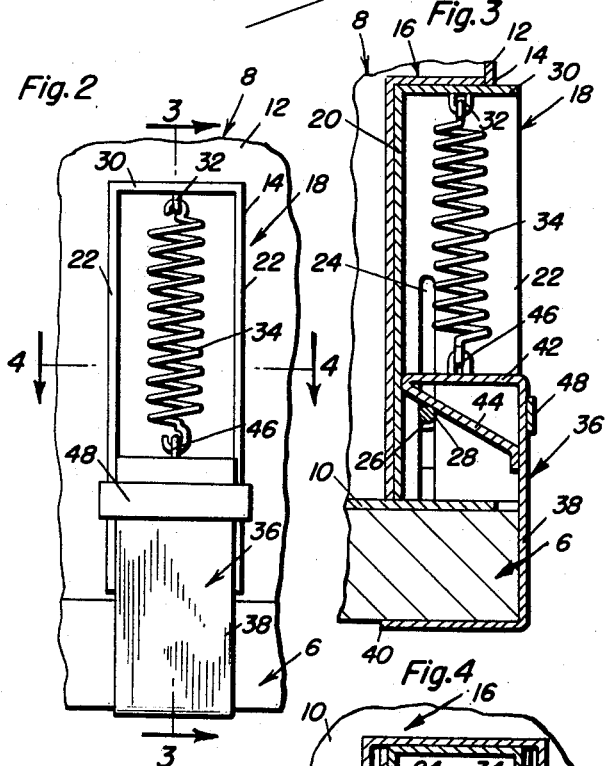
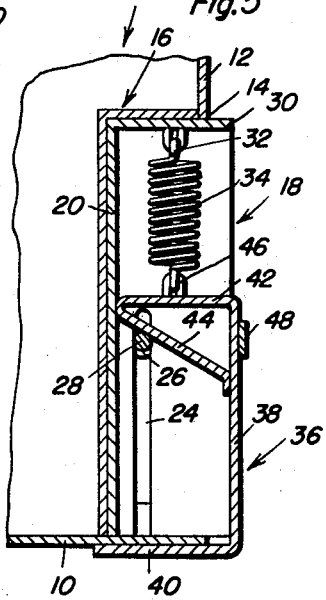
William M. Crump
Frederick F. Klockmann
INVENTORS
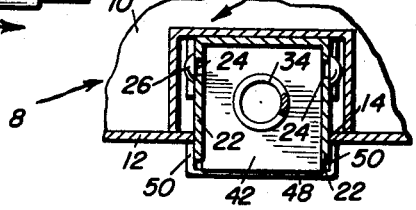

United States Patent Office 2,923,516
Patented Feb. 2, 1960

2,923,516

TACKLE BOX WITH SPRING-BIASED CLAMP

William M. Crump, Redwood City, and Frederick F. Klockmann, Palo Alto, Calif.; said Crump assignor of twenty-five percent to William D. Koon, Redwood City, Calif.

Application December 2, 1957, Serial No. 700,013

3 Claims. (Cl. 248—361)

This invention relates to a fishing tackle box but more particularly to a simple, efficient and practical spring-biased clamping device which is appropriately mounted on the rear vertical wall adjacent the bottom of the box so that the box may be conveniently and reliably clamped on a seat board or the like in a fishing boat.

The obvious object of the invention is to provide a novel clamping device which is such in construction that it may be mounted on the rear wall of the box adjacent the bottom of the box and which is characterized by a spring-returned extensible and retractable seat-board engaging and box hold-down hook, the construction being such that the hook may be extended by hand and readily engaged beneath the seat-board whereby to thus provide temporary but reliable maintenance of the box in an out-of-the-way but readily accessible position.

Although it is not essential, a preferred embodiment of the invention is, that wherein an opening or slot is formed in the rear wall of the tackle box to accommodate a small box-like housing. The housing is, in effect, an adapter and is located within the compartment space of the box in alignment with the slot and is fastened in position so that it is water-proof. Thus arranged the adapter member serves to accommodate the insertable sheath or case of the clamping device. With this arrangement the clamping device, when the hook is spring retracted is in a substantially out-of-the-way position.

Other objects, features and advantages will become more readily apparent from the following description and the accompanying drawing.

In the drawing:

Fig. 1 is a perspective view showing a fragmentary portion of a boat seat or board and illustrating the tackle box supported and clamped thereon by the improved readily accessible clamping device;

Fig. 2 is an enlarged fragmentary rear elevation of the central portion of the structure seen in Fig. 1;

Figs. 3 and 4 are sections taken on the lines 3—3 and 4—4 respectively of Fig. 2; and Fig. 5 is a view like Fig. 3 showing the box detached and the clamping hook retracted.

In Fig. 1 the boat seat-board is denoted by the numeral 6 and the fishing tackle box, a conventional type, by the numeral 8. The bottom of the box is designated by the numeral 10 and the rear wall by the numeral 12. In the preferred embodiment of the invention a vertical slot 14 is formed in the central portion of the rear wall and the aforementioned small box-like adapter housing 16 is located in the compartment space of the box, fixed securely in place and has its open side aligned with the slot 14. The adapter housing 16 is substantially rectangular and vertically disposed and when arranged as illustrated it serves to accommodate the insertable sheet metal or equivalent guide, sheath or case 18 of the clamping device. This sheath may be described as substantially channel-shaped in cross-section, the web or bottom being denoted at 20 and the spaced parallel side walls at 22, said walls provided with oppositely positioned vertically elongated slots 24 for the headed ends 26 of a horizontal stabilizing pin 28. The pin spans the space between the channel portion and the channel portion extends slightly through and beyond the slot 14, in the manner illustrated. The upper end of the sheath, denoted at 30 is closed and the upper end portion 32 of a coil spring 34 is secured thereto in the manner illustrated. The clamp means proper is a simple one-piece unit and is denoted generally by the numeral 36. It comprises a part made from flat strap metal having a vertical shank 38 which is opposed to and removable in relation to the open side of the channel portion. The shank is provided at its lower end with a lateral turned-in lower leg or portion 40 which is here described as a clamping hook. This is parallel to the bottom of the box and in use as seen in the drawings it reaches beneath and engages the bottom of the boat seat 6. The upper end of the shank has a laterally directed upper leg or portion which is referred to here as a guide member 42 and this extends for movement into the channel portion of the sheath. There is a return-bend 44 provided and this serves as a diagonal brace and a portion thereof is affixed to the stabilizing pin 28 so that the clamp 36 moves up and down in conjunction with the headed pin 28 working in the confining slots 24. The lower end portion of the aforementioned coil spring is connected at 46 to the guide member 42.

If desired and found necessary further rigidity is attained by the use of a simple cross-brace 48. This extends across the midway portion of the open side of the channel of the sheath and has its laterally directed ends or end portions 50 connected as shown in Figs. 1 and 4 with the sidewalls 22 of the channel.

As before stated, it is within the purview of the invention to obviate the necessity of puncturing the wall of the box and building the device into the box in the manner illustrated. That is to say, the slot 14 and housing 16 could be omitted and the sheath attached directly to the exterior of the wall 12. It is preferred, however, that the device be built into the box in the manner shown where it is in a practical and out-of-the-way position.

The normal retracted position of the clamping hook means 36 is shown in Fig. 5 whereas the other views show the extended position wherein the bottom 10 of the box rests atop the seat-board and the clamping and retaining hook or finger 40 engages beneath the seat-board.

Minor changes in shape, size, materials and rearrangement of elements or parts may be resorted to in actual practice without departing from the spirit of the invention or scope of the invention as claimed.

What is claimed as new is as follows:

1. Means for securing a box on a support, said means comprising a generally channel-shaped guide mounted vertically on a wall of the box, a substantially U-shaped clamp including a horizontal upper leg slidable in the guide and further including a horizontal lower leg projecting beneath the box and engageable beneath the support, a coil spring suspended in the upper portion of the guide and connected to the clamp for yieldingly urging same toward operative position, and means slidably securing the clamp on the guide.

2. Means for securing a box on a support, said means comprising a generally channel-shaped guide mounted vertically on a wall of the box, a substantially U-shaped clamp including a horizontal upper leg slidable in the guide and further including a horizontal lower leg projecting beneath the box and engageable beneath the support, a coil spring suspended in the upper portion of the guide and connected to the clamp for yieldingly urging same toward operative position, and means slidably securing the clamp on the guide, said guide comprising side walls having opposed vertical slots therein, the last name means including a pin affixed transversely to said upper leg and operable in the slots.

3. Means for securing a box on a support, said means comprising: a generally channel-shaped, vertical, outwardly opening guide recessed in a wall of the box adjacent the bottom thereof and having opposed vertical slots therein, a substantially U-shaped clamp having one end portion slidably engaged in the guide and its other end portion projecting beneath the box for engagement beneath the support, resilient means in the guide connected to the clamp for engaging same with the support, and a pin on the clamp operable in the slots for slidably mounting said clamp on the guide.

References Cited in the file of this patent

UNITED STATES PATENTS

| | | |
|---|---|---|
| 789,374 | Miller | May 9, 1905 |
| 1,455,839 | Hamilton | May 22, 1923 |
| 1,711,717 | Beauford | May 7, 1929 |
| 1,929,833 | Vüren | Oct. 10, 1933 |

FOREIGN PATENTS

| | | |
|---|---|---|
| 69,246 | Norway | May 14, 1945 |